US010719770B2

(12) United States Patent
Bakis et al.

(10) Patent No.: US 10,719,770 B2
(45) Date of Patent: Jul. 21, 2020

(54) SYSTEM AND METHOD FOR ENHANCED CHATFLOW APPLICATION

(71) Applicant: International Business Machines Corporation, Armonk, NY (US)

(72) Inventors: Raimo Bakis, Briarcliff Manor, NY (US); Ladislav Kunc, Hlusice (CZ); David Nahamoo, Great Neck, NY (US); Lazaros Polymenakos, West Harrison, NY (US); John Zakos, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 15/279,250

(22) Filed: Sep. 28, 2016

(65) Prior Publication Data

US 2018/0089584 A1    Mar. 29, 2018

(51) Int. Cl.
    *G06N 5/04* (2006.01)
(52) U.S. Cl.
    CPC .................................. *G06N 5/04* (2013.01)
(58) Field of Classification Search
    CPC .................................................. G06N 5/04
    See application file for complete search history.

(56) References Cited

U.S. PATENT DOCUMENTS

| 8,432,919 | B2 | 4/2013 | Seren et al. |
| 9,002,960 | B2 | 4/2015 | Drews et al. |
| 10,332,508 | B1 * | 6/2019 | Hoffmeister ............ G10L 15/16 |
| 10,388,274 | B1 | 8/2019 | Hoffmeister |
| 2002/0077815 | A1 | 6/2002 | Zhang et al. |
| 2011/0125734 | A1 | 5/2011 | Duboue et al. |

(Continued)

FOREIGN PATENT DOCUMENTS

| WO | WO-2009061390 A1 * | 5/2009 | ......... G06F 17/2785 |
| WO | WO-2018009490 A1 * | 1/2018 | ......... G06F 17/2785 |

OTHER PUBLICATIONS

Yuan et al., "Watson and healthcare: How natural language processing and semantic Search could revolutionize clinical decision support," IBM developerWorks, Apr. 12, 2011.

(Continued)

*Primary Examiner* — Alan Chen
*Assistant Examiner* — Urmana Islam
(74) *Attorney, Agent, or Firm* — Pepper Hamilton LLP

(57) ABSTRACT

Embodiments provide a computer implemented method of training an enhanced chatflow system, comprising: ingesting a corpus of information comprising at least one user input node corresponding to a user question and at least one expert-designed variation for each user input node; matching one or more user inputs to one or more corresponding dialog nodes using regular expressions and delimiters; ingesting one or more usage logs from a deployed dialog system, each usage log comprising at least one user input node; for each user input node: designating the node as a class; storing the node in a dialog node repository; designating each of the at least one variations as training examples for the designated class; converting the classes and the training examples into feature vector representations; training one or more classifiers and one or more classification objectives using the feature vector representations.

15 Claims, 6 Drawing Sheets

(56) References Cited

U.S. PATENT DOCUMENTS

| | | |
|---|---|---|
| 2014/0114895 A1 | 4/2014 | Beechum et al. |
| 2014/0163962 A1* | 6/2014 | Castelli ............... G06F 17/2715 704/9 |
| 2016/0148612 A1* | 5/2016 | Guo ........................ G06F 17/27 704/257 |
| 2017/0039469 A1 | 2/2017 | Majumdar |
| 2017/0228361 A1* | 8/2017 | Zhang ................. G06F 17/2705 |

OTHER PUBLICATIONS

High, "The Era of Cognitive Systems: An Inside Look at IBM Watson and How it Works," IBM Redbooks, Dec. 12, 2012.
Ryan Kiros et al., "Skip-Thought Vectors," cs-CL Jun. 2015.
Pennington et al., "Glove: Global vectors for word representation," Proceedings of the 2014 Conference on Empirical Methods in Natural Language Processing (EMNLP), pp. 1532-1543, Doha, Qatar, October. Association for Computational Linguistics.
Mikolov et al., "Distributed representations of words and phrases and their compositionality," Advances in Neural Information Processing Systems 26: 27th Annual Conference on Neural Information Processing Systems (NIPS), pp. 3111-3119, 2013.
Moreno-Seco, et al., "Comparison of classifier fusion methods for classification in pattern recognition tasks," Lecture Notes in Computer Science, vol. 4109, pp. 705-713, 2006.
Non-Final Office Action dated Apr. 16, 2019 in related U.S. Appl. No. 15/279,248.
U.S. Appl. No. 15/279,250, filed Sep. 28, 2016, 2018/0089584 A1.
U.S. Appl. No. 15/279,248, filed Sep. 28, 2016, 2018/0091457 A1.
Non-Final Office Action dated Nov. 29, 2019 in related U.S. Appl. No. 15/279,248.

* cited by examiner

SYSTEM AND METHOD FOR ENHANCED CHATFLOW APPLICATION

TECHNICAL FIELD

The present application relates generally to a system and method that can be used to create a more efficient and accurate classifier system for the use in chatflow applications.

BACKGROUND

Existing chatflow dialog systems use a human expert-designed, rule-based approach to the development of dialog applications. Such an approach has very high accuracy but relatively low recall. It requires the development of a large number of variations of possible user input by a human expert in order to achieve such accuracy. It also requires the introduction of new nodes and variations when the system fails on unseen user input. A "node" is an answer or system block called upon by the presence of a particular user input, while a "variation" is a semantical reordering of a particular user input that conveys the same request as the original user input, but uses a different grammatical structure or different terms. What is needed is to strike a better balance between accuracy and recall by using a statistical classifier approach in parallel with a rule-based system.

SUMMARY

Embodiments can provide a computer implemented method, in a data processing system comprising a processor and a memory comprising instructions which are executed by the processor to cause the processor to train an enhanced chatflow system, the method comprising: ingesting, using a rule-based module, a corpus of information comprising at least one user input node corresponding to a user question and at least one expert-designed variation for each user input node; matching, using the rule-based module, one or more user inputs to one or more corresponding dialog nodes using regular expressions and delimiters; ingesting, using a statistical matching module, one or more usage logs from a deployed dialog system, each usage log comprising at least one user input node; for each user input node: designating the node as a class; storing the node in a dialog node repository; designating each of the at least one variations as training examples for the designated class; converting the classes and the training examples into feature vector representations; training one or more classifiers using the one or more feature vector representations of the classes; training classification objectives using the one or more feature vector representations of the training examples; and incorporating the training of the classifiers and the classification objectives into enhanced chatflow system.

Embodiments can further provide a method further comprising ingesting, using the statistical matching module, the expert-designed variations in addition to the usage logs.

Embodiments can further provide a method further comprising expanding, using the rule-based module, the regular expressions and delimiters using synonyms harvested through one or more external data sources.

Embodiments can further provide a method further comprising fixing the rule-based module such that no further alteration to the regular expressions or delimiters is allowed; ingesting, using the statistical matching module, the expert-designed variations in addition to the usage logs; and training, using the statistical matching module, new classes based upon analysis of the expert-designed variations.

Embodiments can further provide a method further comprising ingesting, using the statistical matching module, the expert-designed variations in addition to the usage logs; training, using the statistical matching module, new classes based upon analysis of the expert-designed variations; and replacing the rule-based module with the statistical matching module.

Embodiments can further provide a method further comprising training, using the statistical matching module, the classifiers and the classification objectives using at least one of: linear regression, logistic regression, Multi-Layer-Perceptrons (MLP), and Deep Belief Network (DBN) classifiers.

Embodiments can further provide a method further comprising converting, using the statistical matching module, the classes and training examples into feature vector representations using at least one of: directly combining word vectors, convolutional neural networks to transform variable length sentences to fixed-length feature vector representations, or sentence-to-vector encoders trained on general or domain specific corpora.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise an enhanced chatflow processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
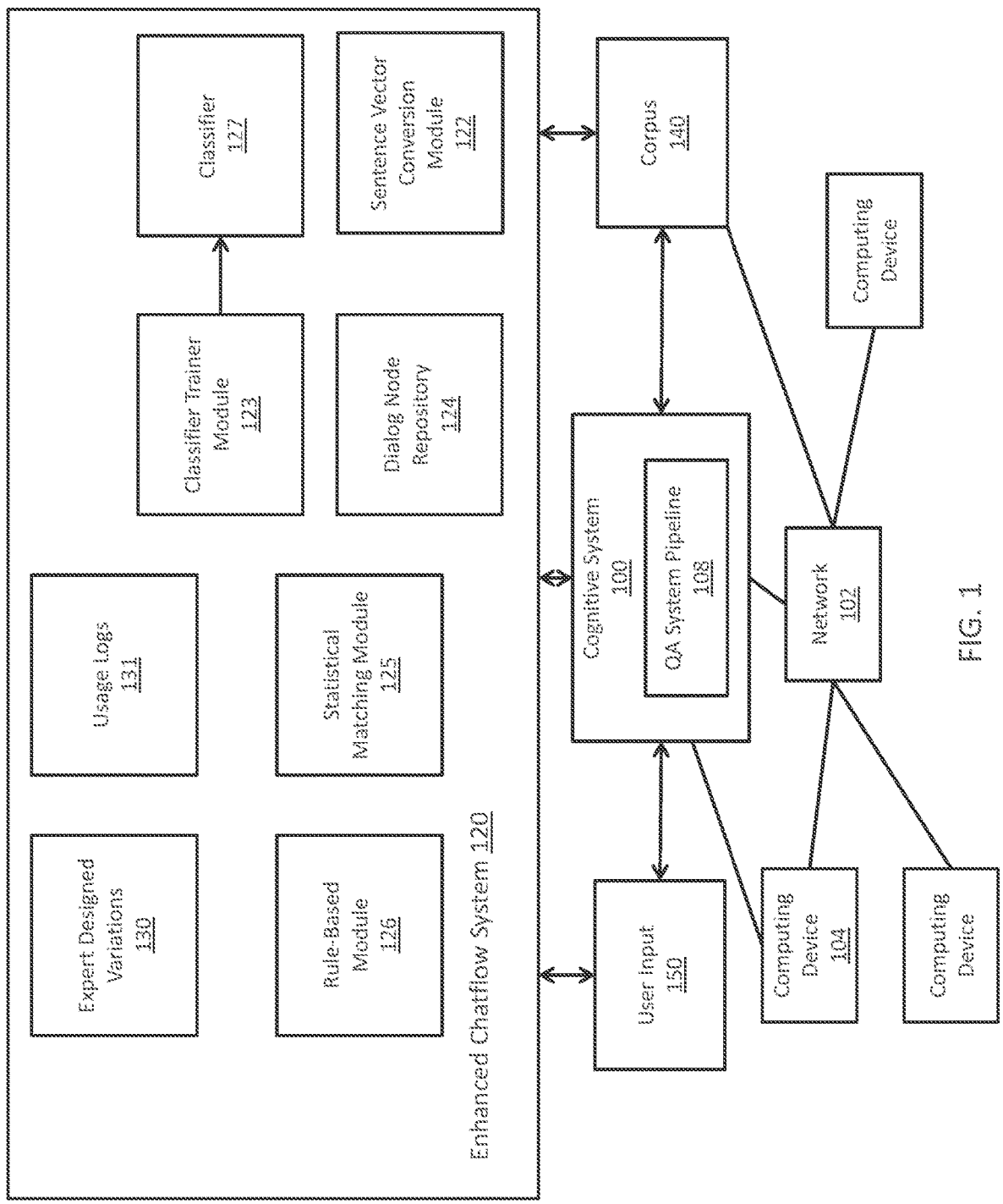
FIG. 1 depicts a schematic diagram of one illustrative embodiment of a cognitive system implementing an enhanced chatflow system in a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Using data derived from an already completed/deployed Watson Engagement Advisor (WEA)-type dialog application, a corpus of example and variation sentences coded by a human designer can be classified as the input to the classification training, while the nodes that they belong to can be classified as the classification objective. Alternatively, the classification objective can be directly classified as the expected response to the given input or the action that needs to be taken that is triggered by the given input. The example and variation sentences can be transformed into feature vector representations using any available technique, including by not limited to: directly combining word vectors, using convolutional neural networks to transform variable length sentences to fixed-length feature vector representations, or using sentence-to-vector encoders trained on general or domain specific corpora. These transformations can be performed in order to take advantage of the principle that feature vector representations or embedding capture the semantic meaning of words and phrases so as to allow for generalization on unseen examples, variations, or synonyms. Classifiers can then be trained based on different algorithmic approaches, including, but not limited to: linear regression, logistic regression, Multi-Layer-Perceptrons (MLP), and Deep Belief Network (DBN) classifiers using any methodology for word and sentence embedding.

The user input can be transformed into a vector representation using the same method used during the training the classifier. The user input processed by the trained classifier can give the probability that this input belongs to one of the corresponding classes/WEA dialog nodes, or direct triggers a specific response or action (depending on how the classifier has been trained). This probability can be used as a confidence score and the system can either pick the class with the highest probability as the desired output node or can use the confidence score for a fusion methodology.

Introducing statistical matching along with the existing rule-based dialog system can lead to a faster initial deployment of a new dialog application and to a continuously improving system once deployed. In particular, the use of statistical matching can reduce the time needed to introduce all the necessary input variations to achieve a level of performance. The deployed enhanced chatflow system can be used to continuously improve the statistical matching in the case of missing paraphrases. Thus, the system can be quickly updated and performance can be improved based on new user input. Various embodiments fordeveloping and updating the rule-based matching system along with the training and re-training of the statistical-based matching system can be employed, including:

Expert-designed variations can be used both for the rule-base and the statistical-based matching. Further expansion of the regular expressions and delimiters with synonyms, example sentences, etc. can be either hand crafted or harvested through external data sources (such as the internet) in order to increase the amount of data to train the statistical matching.

Expert-designed variations can be used solely for the rule-based matching. Usage logs can be used to extend the rule-based system's nodes and variations. Statistical matching can use both the variations and the usage logs to continuously train.

Expert-designed variations can be used solely for the rule-based matching, which can be subsequently fixed once deployed. Statistical matching can use both the variations and the usage logs to continuously train, and can include the introduction of new classes.

Expert-designed variations can be used solely for the rule-based matching, which can be fixed once deployed. Statistical matching can be trained only on the usage logs to catch cases where the rule-based matching fails.

Expert-designed variations can be used for the rule-based matching for the initially deployed system. Statistical matching can be trained on variations and usage logs and can gradually replace the rule-based system.

The statistical classifier can be automatically and continuously trained on new data collected after the deployment of the initial system. By using a classifier system trained on a (relatively small) number of initial human-designed variations, the enhanced chatflow system can: a) be able to achieve a good level of performance on Watson Engagement Advisor (WEA) dialog applications without the need for a comprehensive development of all possible variations and concepts—thus decreasing application development time; and b) increase the accuracy of chatflow matching in completed or deployed applications by using a classifier continuously trained on example data collected from users chatting with the system. Thus, the enhanced chatflow system can have an effect not only on the quality of the deployed dialog solution but also on the speed/practice of development of a new dialog solution.

FIG. 1 depicts a schematic diagram of one illustrative embodiment of a cognitive system 100 implementing a question and answer (QA) pipeline 108 and an enhanced chatflow system 120 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables enhanced chatflow functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In an embodiment, full questions can be generated and entered into the QA system using the enhanced chatflow system 120 described herein. The cognitive system 100 parses and interprets a full question via a QA pipeline 108, and provides a response containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing an enhanced chatflow system 120. As described further in FIGS. 3-6, the enhanced chatflow system 120 can receive user input 150, which can take the form of one or more user-generated question that can warrant an informational response. For instance, "How do I find car parking?" In an embodiment, the user input can be generated by user inputs previously collected during input into a general chatflow application. The enhanced chatflow system 120 can utilize the user data 150 using a sentence vector conversion module 122, a classifier trainer module 123, a dialog node repository 124, and a statistical matching module 125, to train classifiers 127 for statistical matching, which in turn can be used, either in combination with a standard rule-based module 126, or alone, to further refine and enhance the chatflow system, leading to improved deployment times and continuous refinement and training.

Figure 2:
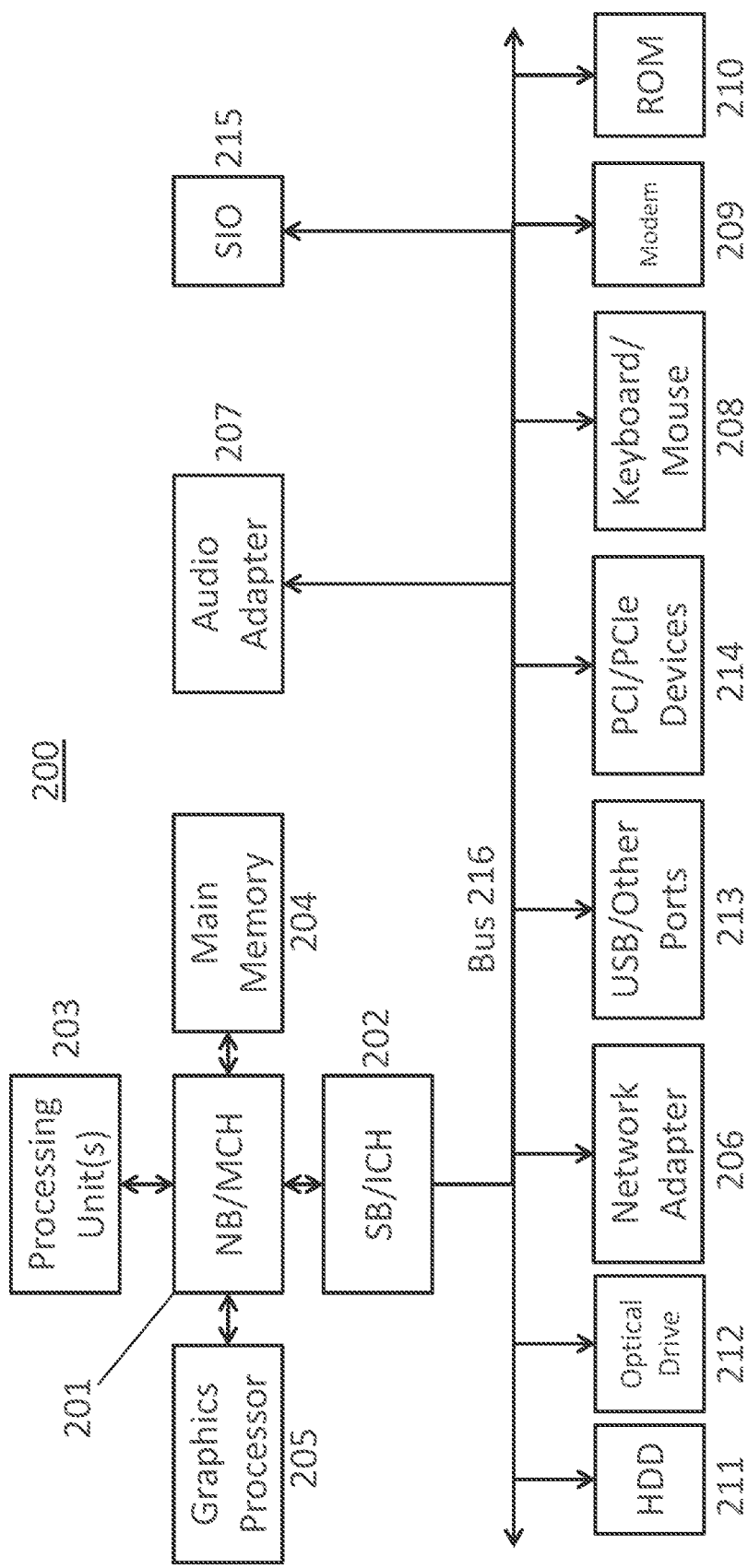
FIG. 2 is a block diagram of an example data processing system in which aspects of the illustrative embodiments may be implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the enhanced chatflow system 120 and cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the enhanced chatflow system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
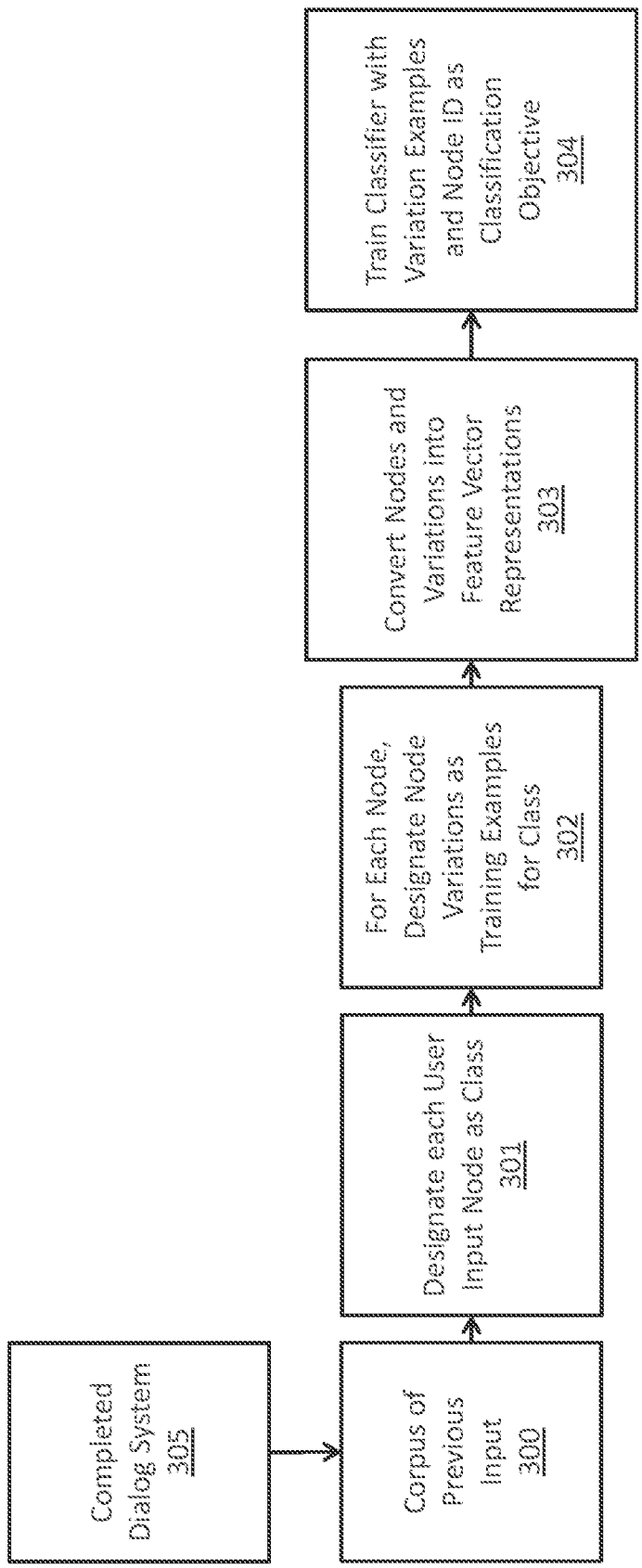
FIG. 3 depicts a flowchart illustrating a training mode for an enhanced chatflow system, in accordance with embodiments described herein.

FIG. 3 depicts a flowchart illustrating a training mode for an enhanced chatflow system, in accordance with embodiments described herein. To define: a "node" can be an answer or answer chain called upon by the presence of an input question, while a "variation" is a semantical reordering of a particular question that conveys the same request as the original question, but uses a different grammatical structure or word choice. Both the normal questions and the variations can be considered as user input 150 (as shown in FIG. 1). Upon reception of a corpus of user input 300 previously derived from an already completed/deployed dialog system 305, the system can designate each user input node (which can be an example or exemplar question pointing to a response) as a class 301, and store them in a dialog node repository 124 (as shown in FIG. 1). A completed/deployed dialog system can be a system that has already been in use for a predetermined period of time, such that one or more users can have interacted with the system and input questions and received answers. In an embodiment, the completed dialog system 305 can be a standard rule-based module 126 (as shown in FIG. 1), which can use a call-and-response model to analyze an input question in order to output a proscribed answer. The question and answer pairings can be previously input into the completed dialog system 305 by a subject matter expert with knowledge of the particular field or activity the completed dialog system 305 is designed. For each node, the system can designate all possible variations of the node as training examples for the class 302.

The enhanced chatflow system can then convert the user nodes and their training examples (variations) into feature vector representations 303. The system can, through a sentence vector conversion module 122 (as shown in FIG. 1), utilize a multitude of techniques to perform the vector representation conversion, including, but not limited to: directly combining word vectors, using convolutional neural networks to transform variable length sentences to fixed-length feature vector representations, or using sentence-to-vector encoders trained on general or domain specific corpora. After conversion, the system, using a classifier trainer module 123 (as shown in FIG. 1) can then train one or more classifiers using the one or more converted examples and their variations, as well as train one or more classification objectives as the particular node to which the example and its variations correspond 304. The classifiers and the classification objectives can be trained based on a multitude of different algorithmic approaches, including but not limited to: linear regression, logistic regression, Multi-Layer-Perceptrons (MLP), and Deep Belief Network (DBN) classifiers using any methodology for word and sentence embedding. The enhanced chatflow system can then use the classifiers and classification objectives derived from the completed dialog system 350 in order to enhance analysis of the user input generated in the new dialog system.

Figure 4:
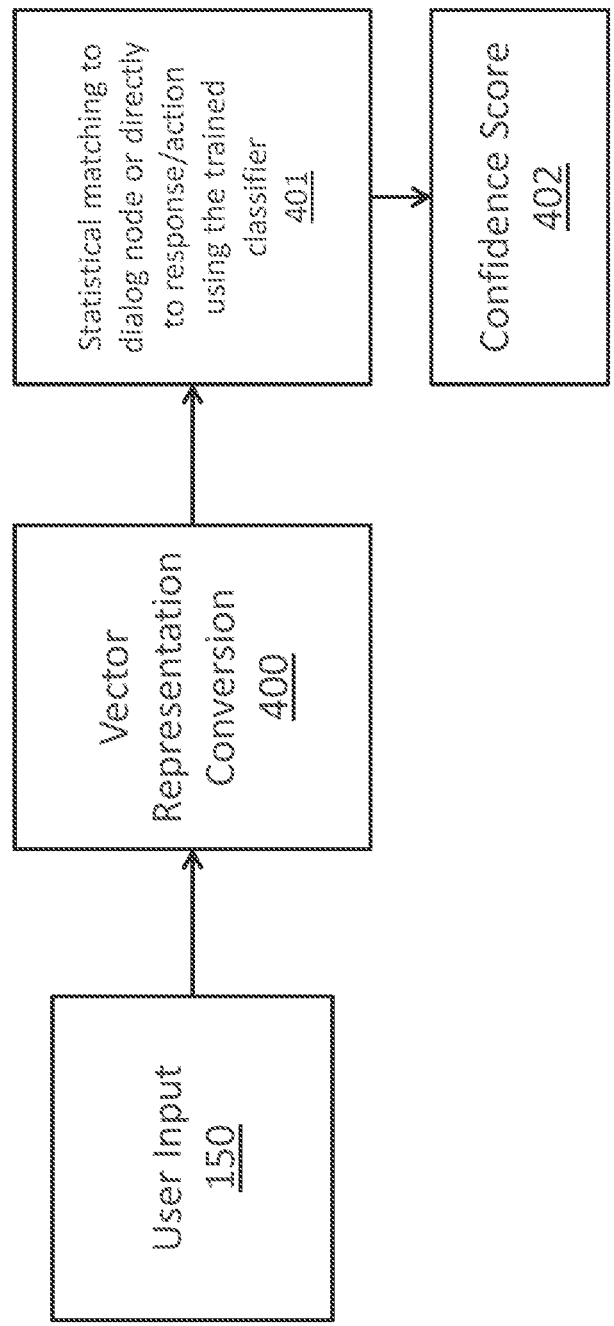
FIG. 4 depicts a flowchart illustrating a statistical matching module functionality during the deployment of an enhanced chatflow system, according to embodiments described herein.

FIG. 4 depicts a flowchart illustrating a statistical matching module functionality during the deployment of an enhanced chatflow system, according to embodiments described herein. Upon reception of user input 150, the enhanced chatflow system can transform the user input into a user input vector representation 400 using the same conversion method used during the training mode. Alternately, the system can use an alternate vector conversion method. The statistical matching module 125 (as shown in FIG. 1) can use the classifiers 127 (as shown in FIG. 1) trained during the training mode as the basis for the statistical analysis. The vectored input can be processed by the statistical matching module 125 against the trained classifier to calculate the probability that the particular user input 150 belongs to one of the corresponding classes, which can be a dialog node 401. Depending on the training of the classifier, the system can also calculate the probability that the particular user input 150 belongs to a direct trigger for a response or action. The probability can be used as a confidence score 402, which can be used by the system to choose the class to which the user input 150 has the highest likelihood of corresponding, or which can be used for a subsequent fusion methodology.

Figure 5:
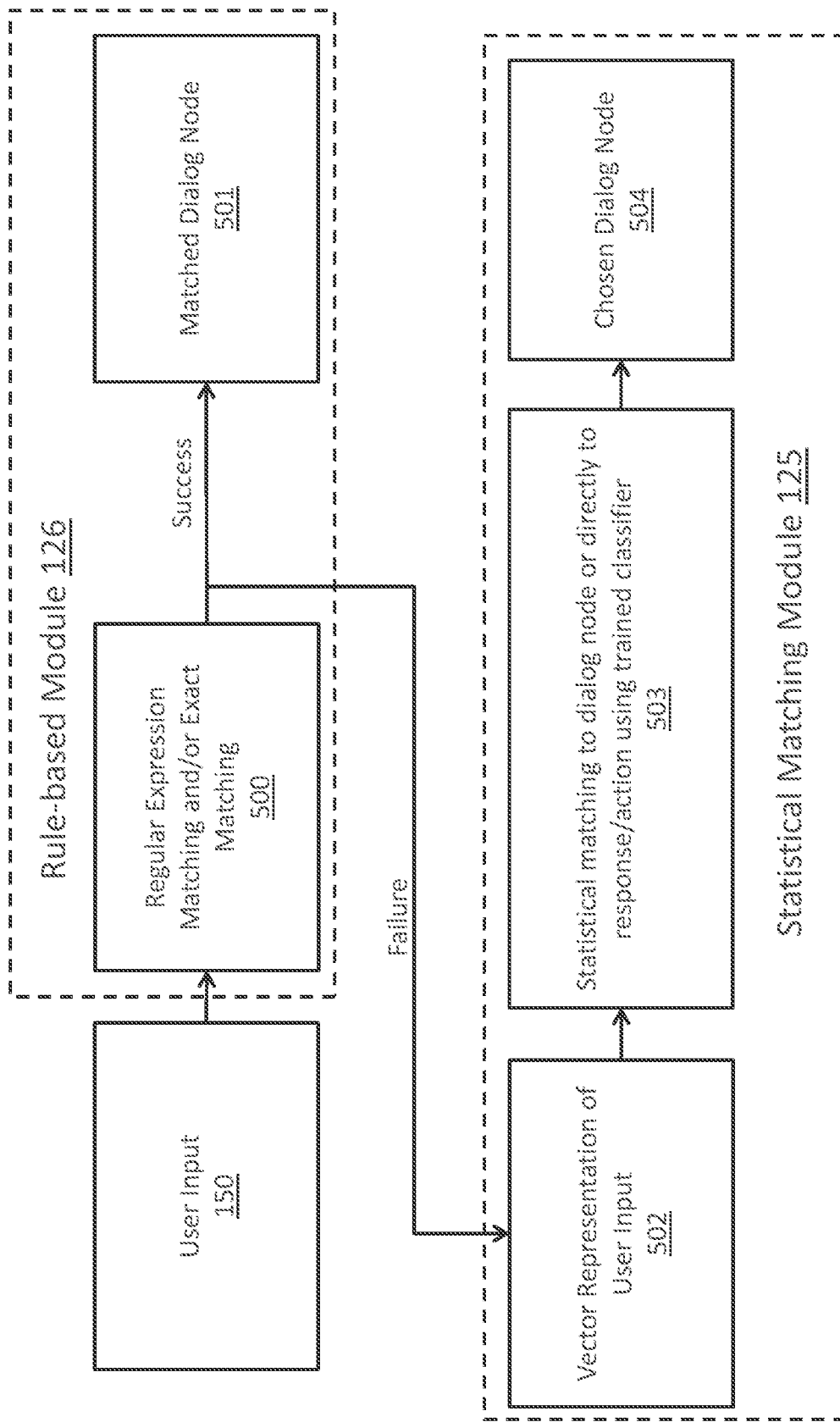
FIG. 5 depicts a flowchart illustrating hybrid rule-based and statistical matching functionality during the deployment of an enhanced chatflow system, according to embodiments described herein.

FIG. 5 depicts a flowchart illustrating hybrid rule-based and statistical matching functionality during the deployment of an enhanced chatflow system, according to embodiments described herein. The enhanced chatflow system, upon receiving user input 150, can first subject the user input to analysis by a standard rule-based module 126. The rule-based module can perform regular expression matching and/or exact text matching 500 to determine if the user input 150 corresponds to a known dialog node. If the regular expression matching and/or exact text matching is successful, the system can process the user input 150 in accordance with the matched dialog node 501. If the rule-based module 126 fails to match the user input 150 with a known dialog node, the system can process the user input 150 using a statistical matching module 125, which can create a vector representation of the user input 502, and then subject the vector representation to a method of statistical matching using the classifiers previously trained (as described in FIG. 4) in order to determine the probability that the user input belongs to a particular dialog node 503. Using the calculated probabilities, the system can process the user input 150 in accordance with the chosen dialog node 504. In an embodiment, the chosen dialog node 504 can be the dialog node having the highest probability of corresponding with the particular user input 150 if the probability is higher than a defined threshold.

Figure 6:
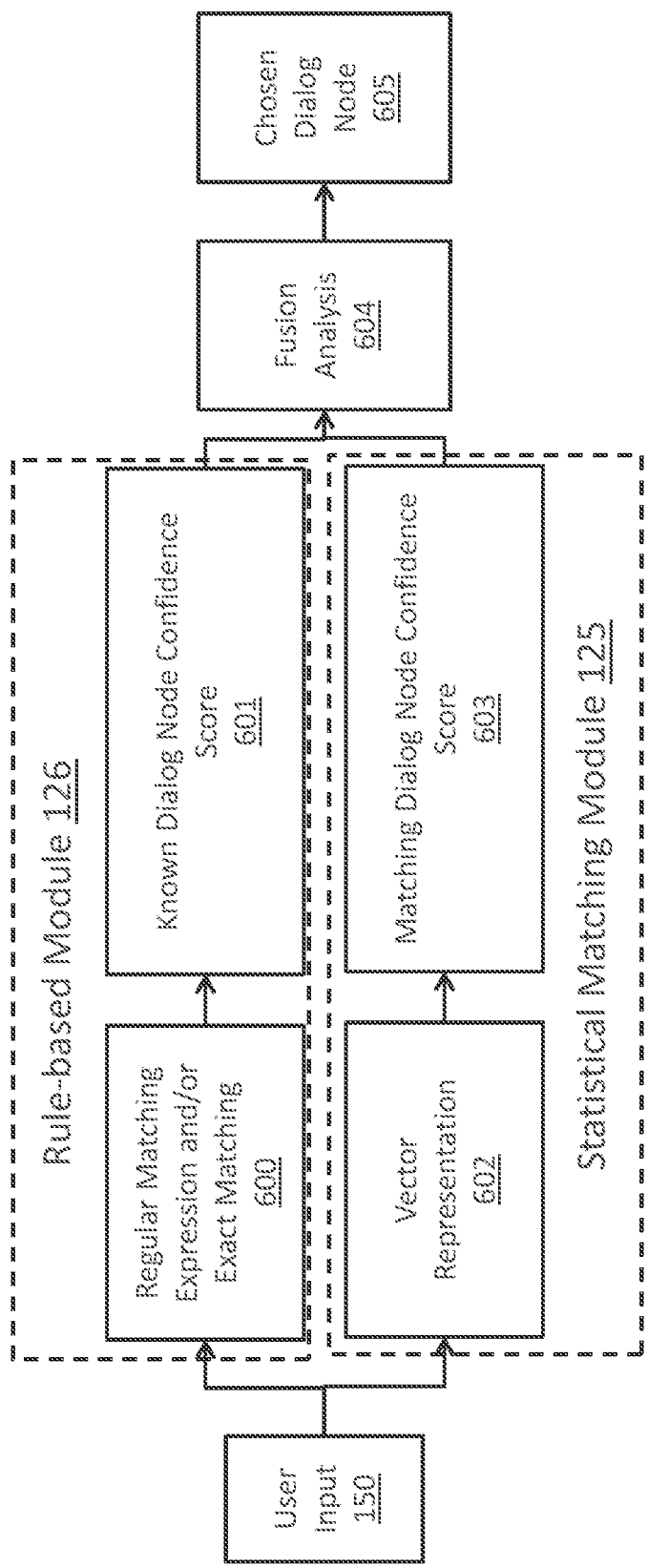
FIG. 6 depicts a flowchart illustrating hybrid rule-based and statistical matching functionality during the deployment of an enhanced chatflow system, according to embodiments described herein.

FIG. 6 depicts a flowchart illustrating hybrid rule-based and statistical matching functionality during the deployment of an enhanced chatflow system, according to embodiments described herein. In an embodiment, the enhanced chatflow system, upon receiving user input 150, can simultaneously subject the user input 150 to analysis by a rule-based module 126 and a statistical matching module 125. The rule based module can perform regular expression matching or exact text matching 600 to determine if the user input 150 corresponds to a known matching dialog node, and can return a known dialog node confidence score 601 corresponding to the likelihood the user input matches with a known node. Concurrently, the system can process the user input 150 using a statistical matching module 125, which can create a vector representation of the user input 602, and then subject the vector representation to a method of statistical matching using the classifiers previously trained (as described in FIG. 4) in order to determine the probability that the user input belongs to a particular dialog node, and can output a matching dialog node confidence score 603. The system can then perform a fusion analysis 604 in order to determine the chosen dialog node 605 to which the user input corresponds.

Fusion analysis 604 methods to choose the results can be many and their effectiveness can depend on the task. In an embodiment, both the statistical matching module 125 and the rule-based module 126 can return a confidence score regarding the top result or the k-top results. Methods of fusion analysis can include, but are not limited to: best score, weighted score, recall weighted score, and best-worst weighted score. The weights for fusing the results can be trained using examples from the training set, which can be the input variations.

Referring back to FIG. 1, in order to continuously update the enhanced chatflow system 120, several methodologies can be applied:

In an embodiment, expert-designed variations 130 can be used both for the rule-based module 126 and the statistical matching module 125. Further expansion of the regular expressions and delimiters with synonyms, example sentences, etc. can be either hand crafted or harvested through external data sources, like the corpus 140 or the internet in order to increase the amount of data to train the statistical matching module 125.

In an embodiment, expert-designed variations 130 can be used solely for the rule-based module 126. Usage logs 131 can be used to extend the rule-based module's 126 nodes and variations. The statistical matching module 125 can use both the variations 130 and the usage logs 131 to continuously train.

In an embodiment, expert-designed variations 130 can be used solely for the rule-based module 126, which can be subsequently fixed once deployed. Fixation can result in a pre-set, unalterable set of rules and matching expressions for use in matching the user input 150 to a corresponding dialog node. The statistical matching module 125 can use both the variations 130 and the usage logs 131 to continuously train, and can include the introduction of new classes.

In an embodiment, expert-designed variations 130 can be used solely for the rule-based module 126, which can be fixed once deployed. The statistical matching module 125 can be trained only on the usage logs 131 to catch cases where the rule-based module 126 fails.

In an embodiment, expert-designed variations 130 can be used for the rule-based module 126 for the initially deployed system. The statistical matching module 125 can be trained on variations 130 and usage logs 131 and can gradually replace the rule-based module 126.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method, in a data processing system comprising a processor and a memory comprising instructions which are executed by the processor to cause the processor to train an enhanced chatflow system, the method comprising:

ingesting, using a rule-based module, a corpus of information comprising at least one user input node corresponding to a user question and at least one expert-designed variation for each user input node;

matching, using the rule-based module, one or more user inputs to one or more corresponding dialog nodes using regular expressions and delimiters;

ingesting, using a statistical matching module, one or more usage logs from a deployed dialog system, each usage log comprising at least one user input node;

for each user input node:
designating the node as a class;
storing the node in a dialog node repository;
designating each of the at least one variations as training examples for the designated class;

converting the classes and the training examples into fixed-length feature vector representations, wherein variable length sentences are transformed to the fixed-length feature vector representations using convolutional neural networks;

training one or more classifiers using the fixed-length feature vector representations of the classes; wherein the step of training the one or more classifiers further comprising:
fixing the rule-based module such that no further alteration to the regular expressions or delimiters is allowed;
ingesting, using the statistical matching module, the expert-designed variations in addition to the usage logs; and
training, using the statistical matching module, the one or more classifiers based upon analysis of the expert-designed variations and the usage logs;

training classification objectives using the fixed-length feature vector representations of the training examples; and incorporating the training of the classifiers and the classification objectives into the enhanced chatflow system.

2. The method as recited in claim 1, further comprising:
ingesting, using the statistical matching module, the expert-designed variations in addition to the usage logs.

3. The method as recited in claim 1, further comprising:
expanding, using the rule-based module, the regular expressions and delimiters using synonyms harvested through one or more external data sources.

4. The method as recited in claim 1, further comprising:
ingesting, using the statistical matching module, the expert-designed variations in addition to the usage logs;
training, using the statistical matching module, new classes based upon analysis of the expert-designed variations and the usage logs; and
replacing the rule-based module with the statistical matching module.

5. The method as recited in claim 1, further comprising:
training, using the statistical matching module, the classifiers and the classification objectives using Deep Belief Network (DBN) classifiers.

6. A computer program product for enhanced chatflow, the computer program product comprising a computer readable storage medium having program instructions embodied therewith, the program instructions executable by a processor to cause the processor to:

ingest, using a rule-based module, a corpus of information comprising at least one user input node corresponding to a user question and at least one expert-designed variation for each user input node;

match, using the rule-based module, one or more user inputs to one or more corresponding dialog nodes using regular expressions and delimiters;

ingest, using a statistical matching module, one or more usage logs from a deployed dialog system, each usage log comprising at least one user input node;

for each user input node:
designate the node as a class;
store the node in a dialog node repository;
designate each of the at least one variations as training examples for the designated class;

convert the classes and the training examples into fixed-length feature vector representations, wherein variable length sentences are transformed to the fixed-length feature vector representations using convolutional neural networks;

train one or more classifiers using the fixed-length feature vector representations of the classes;

wherein the step of training the one or more classifiers further comprising:

fix the rule-based module such that no further alteration to the regular expressions or delimiters is allowed;

ingest, using the statistical matching module, the expert-designed variations in addition to the usage logs; and train, using the statistical matching module, the one or more classifiers based upon analysis of the expert-designed variations and the usage logs;

train classification objectives using the fixed-length feature vector representations of the training examples; and incorporate the training of the classifiers and the classification objectives into the enhanced chatflow system.

7. The computer program product as recited in claim 6, wherein the processor is further caused to:

ingest, using the statistical matching module, the expert-designed variations in addition to the usage logs.

8. The computer program product as recited in claim 6, wherein the processor is further caused to:

expand, using the rule-based module, the regular expressions and delimiters using synonyms harvested through one or more external data sources.

9. The computer program product as recited in claim 6, wherein the processor is further caused to:

ingest, using the statistical matching module, the expert-designed variations in addition to the usage logs;

train, using the statistical matching module, new classes based upon analysis of the expert-designed variations and the usage logs; and replace the rule-based module with the statistical matching module.

10. The computer program product as recited in claim 6, wherein the processor is further caused to:

train, using the statistical matching module, the classifiers and the classification objectives using Deep Belief Network (DBN) classifiers.

11. An enhanced chatflow system, comprising:

A processor and a memory comprising instructions which are executed by the processor to cause the processor to:

ingest, using a rule-based module, a corpus of information comprising at least one user input node corresponding to a user question and at least one expert-designed variation for each user input node;

match, using the rule-based module, one or more user inputs to one or more corresponding dialog nodes using regular expressions and delimiters;

ingest, using a statistical matching module, one or more usage logs from a deployed dialog system, each usage log comprising at least one user input node;

for each user input node:

designate the node as a class;

store the node in a dialog node repository;

designate each of the at least one variations as training examples for the designated class;

convert the classes and the training examples into fixed-length feature vector representations, wherein variable length sentences are transformed to the fixed-length feature vector representations using convolutional neural networks;

train one or more classifiers using the fixed-length feature vector representations of the classes;

wherein the step of training the one or more classifiers further comprising:

fix the rule-based module such that no further alteration to the regular expressions or delimiters is allowed;

ingest, using the statistical matching module, the expert-designed variations in addition to the usage logs; and train, using the statistical matching module, the one or more classifiers based upon analysis of the expert-designed variations and the usage logs;

train classification objectives using the fixed-length feature vector representations of the training examples; and incorporate the training of the classifiers and the classification objectives into the enhanced chatflow system.

12. The system as recited in claim 11, wherein the enhanced chatflow processor is further configured to:

ingest, using the statistical matching module, the expert-designed variations in addition to the usage logs.

13. The system as recited in claim 11, wherein the enhanced chatflow processor is further configured to:

expand, using the rule-based module, the regular expressions and delimiters using synonyms harvested through one or more external data sources.

14. The system as recited in claim 11, wherein the enhanced chatflow processor is further configured to:

ingest, using the statistical matching module, the expert-designed variations in addition to the usage logs;

train, using the statistical matching module, new classes based upon analysis of the expert-designed variations and the usage logs; and replace the rule-based module with the statistical matching module.

15. The system as recited in claim 11, wherein the enhanced chatflow processor is further configured to:

train, using the statistical matching module, the classifiers and the classification objectives using Deep Belief Network (DBN) classifiers.

* * * * *